United States Patent
Kobayashi

(10) Patent No.: US 10,194,404 B2
(45) Date of Patent: Jan. 29, 2019

(54) TRANSMISSION CONTROL APPARATUS AND TRANSMISSION CONTROL METHOD

(71) Applicant: FUJITSU LIMITED, Kawasaki-shi, Kanagawa (JP)

(72) Inventor: Takaharu Kobayashi, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/711,348

(22) Filed: Sep. 21, 2017

(65) Prior Publication Data
US 2018/0103439 A1   Apr. 12, 2018

(30) Foreign Application Priority Data

Oct. 6, 2016   (JP) .................................. 2016-198054

(51) Int. Cl.
*H04W 52/34* (2009.01)
*H04L 12/18* (2006.01)
(Continued)

(52) U.S. Cl.
CPC ......... *H04W 52/346* (2013.01); *H04L 12/185* (2013.01); *H04W 52/143* (2013.01);
(Continued)

(58) Field of Classification Search
None
See application file for complete search history.

(56) References Cited

U.S. PATENT DOCUMENTS 8,515,360 B2 * 8/2013 Zhang .................. H04B 7/0452
455/513

2008/0008110 A1 * 1/2008 Kishigami ............ H04W 16/28
370/310

(Continued)

FOREIGN PATENT DOCUMENTS

| JP | 2009-278238 | 11/2009 |
|----|-------------|---------|
| JP | 2010-193189 | 9/2010 |
| JP | 2010-263487 | 11/2010 |

OTHER PUBLICATIONS

Jingxiu Liu, et al., "A Low Complexity Capacity-Greedy User Selection Scheme for Zero-Forcing Beamforming", Vehicular Technology Conference, 2009. IEEE, VTC Spring 2009—Apr. 2009 (5 pages).

(Continued)

*Primary Examiner* — Fayyaz Alam
(74) *Attorney, Agent, or Firm* — Fujitsu Patent Center

(57) ABSTRACT

A transmission control apparatus determines a group of terminal devices that are destinations to which signals are simultaneously transmitted out of a plurality of terminal devices. The transmission control apparatus includes a processor that executes a process including: calculating received power vectors corresponding to received power of the respective terminal devices; determining, based on an inner product between a received power vector of a first terminal device that is determined to belong to the group of terminal devices already and a received power vector of a second terminal device that is a candidate to be newly added to the group of terminal devices, whether to add the second terminal device to the group of terminal devices; and generating transmission signals to be transmitted to a group of terminal devices that are determined in accordance with determination at the determining.

9 Claims, 9 Drawing Sheets

(51) Int. Cl.
*H04W 52/14* (2009.01)
*H04W 72/04* (2009.01)
*H04W 76/15* (2018.01)

(52) U.S. Cl.
CPC ...... *H04W 72/0486* (2013.01); *H04W 72/042* (2013.01); *H04W 72/0473* (2013.01); *H04W 76/15* (2018.02)

(56) References Cited

U.S. PATENT DOCUMENTS

| | | | | |
|---|---|---|---|---|
| 2008/0242309 | A1* | 10/2008 | Borst | H04B 7/0426 455/452.1 |
| 2009/0016463 | A1* | 1/2009 | Roh | H04B 7/0417 375/295 |
| 2012/0250552 | A1* | 10/2012 | Zhang | H04B 7/0452 370/252 |
| 2012/0300754 | A1* | 11/2012 | Rosenqvist | H04B 7/024 370/336 |
| 2017/0063437 | A1* | 3/2017 | Elsherif | H04L 5/006 |

OTHER PUBLICATIONS

Takashi Seyama, et al., "Study of Coordinated Radio Resource Scheduling Algorithm for 5G Ultra High-Density Distributed Antenna Systems", IEICE Technical Report, vol. 115, No. 472, Mar. 2016 (6 pages).

Jun Shikida, et al., "Performance Evaluation of Low Complexity Multi-User MIMO Scheduling Schemes for Massive MIMO System", IEICE Technical Report, vol. 115, No. 472, Mar. 2016, pp. 267-272 (6 pages).

* cited by examiner

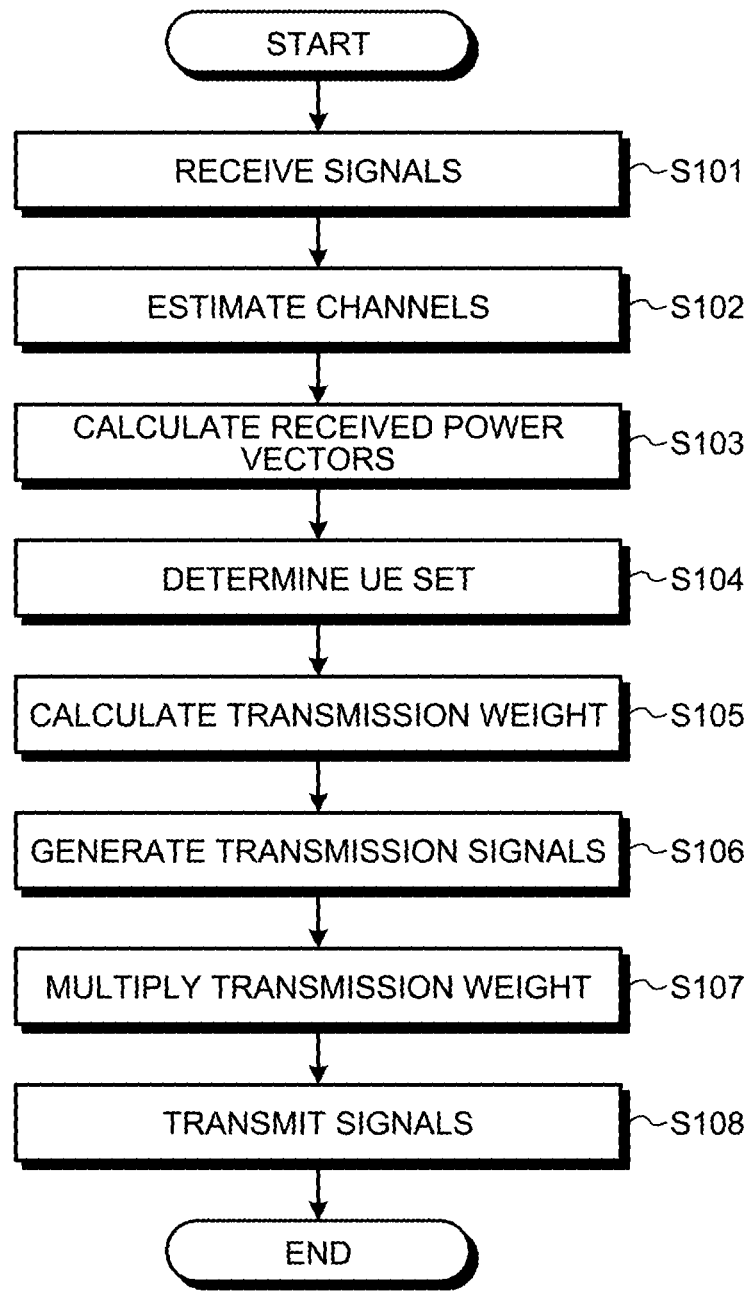

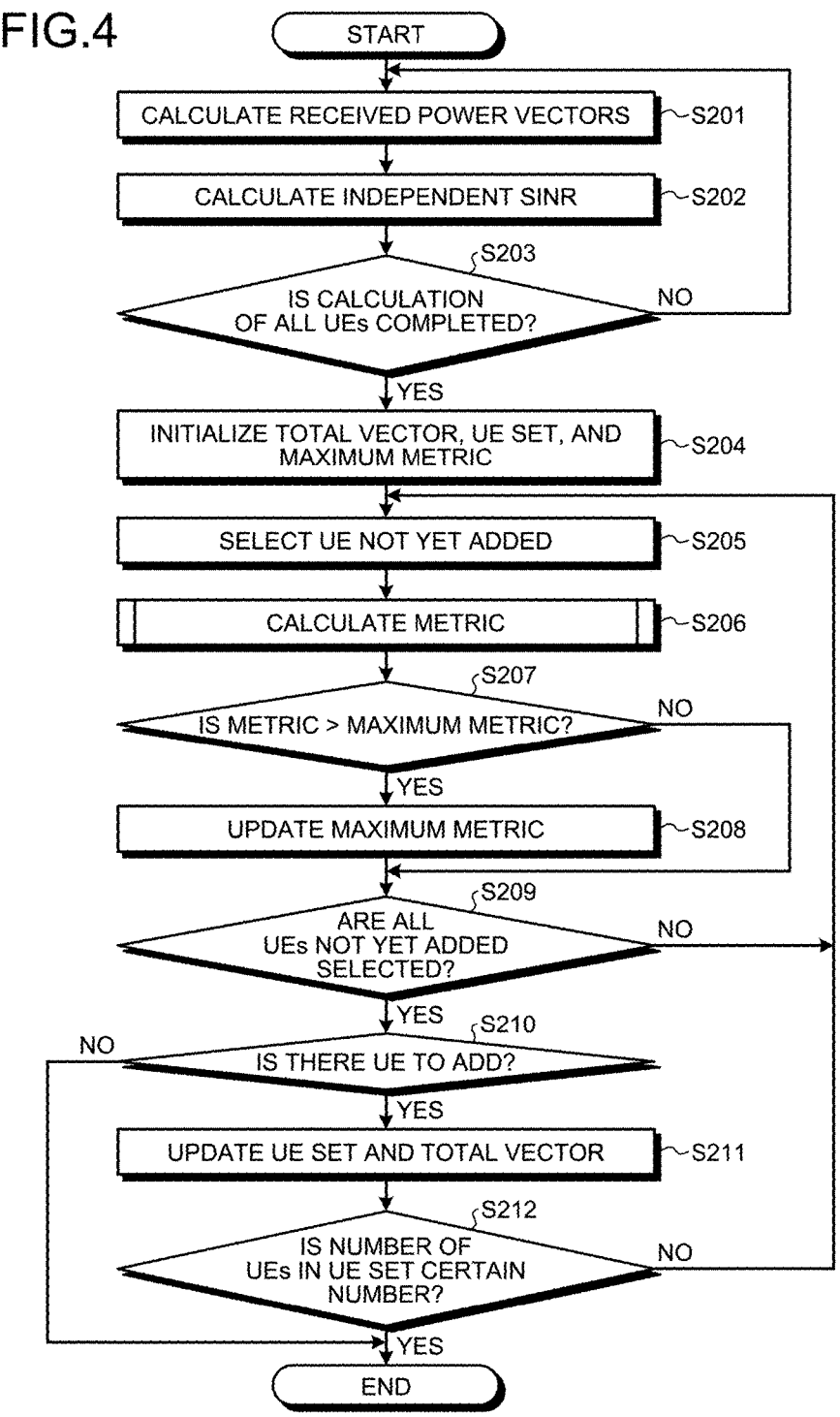

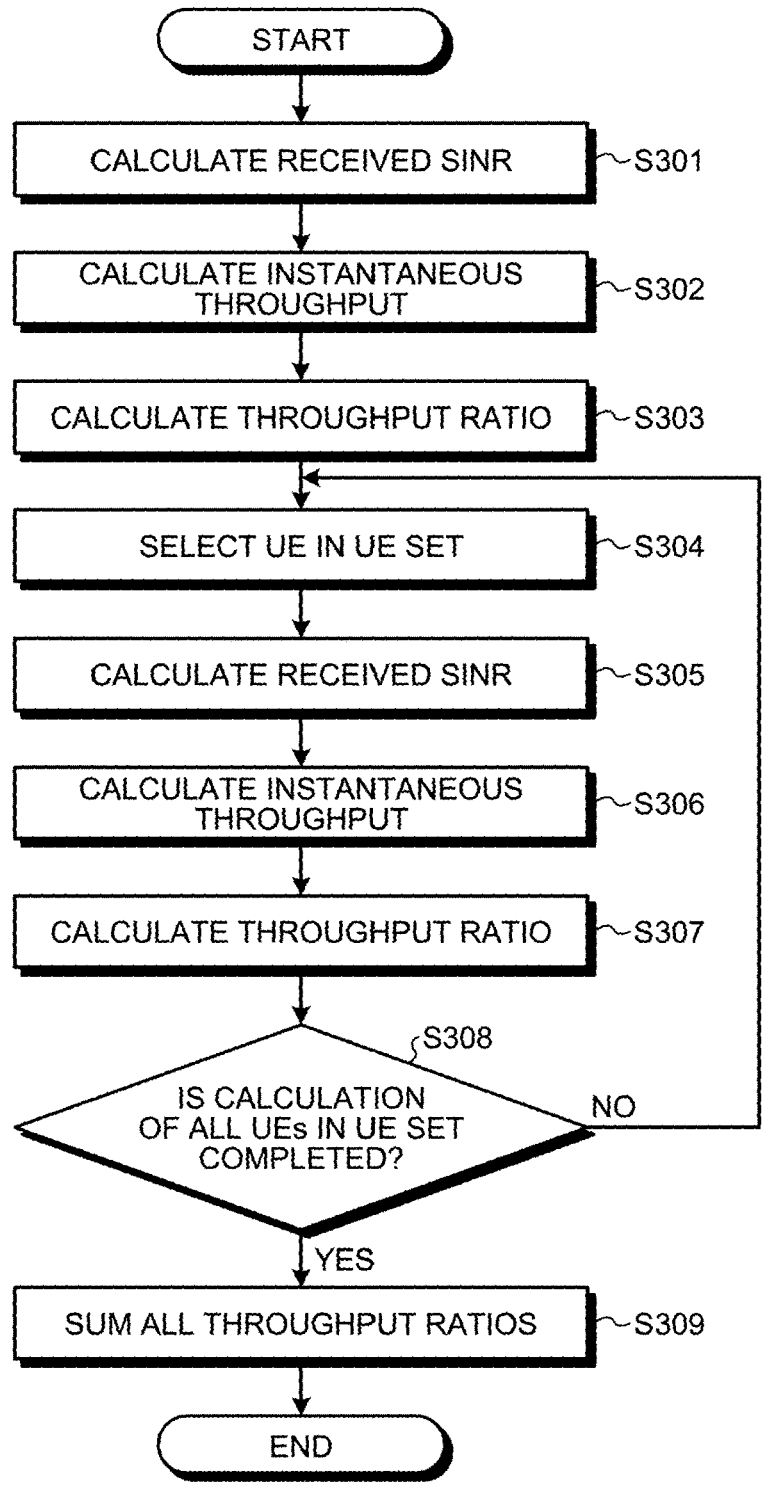

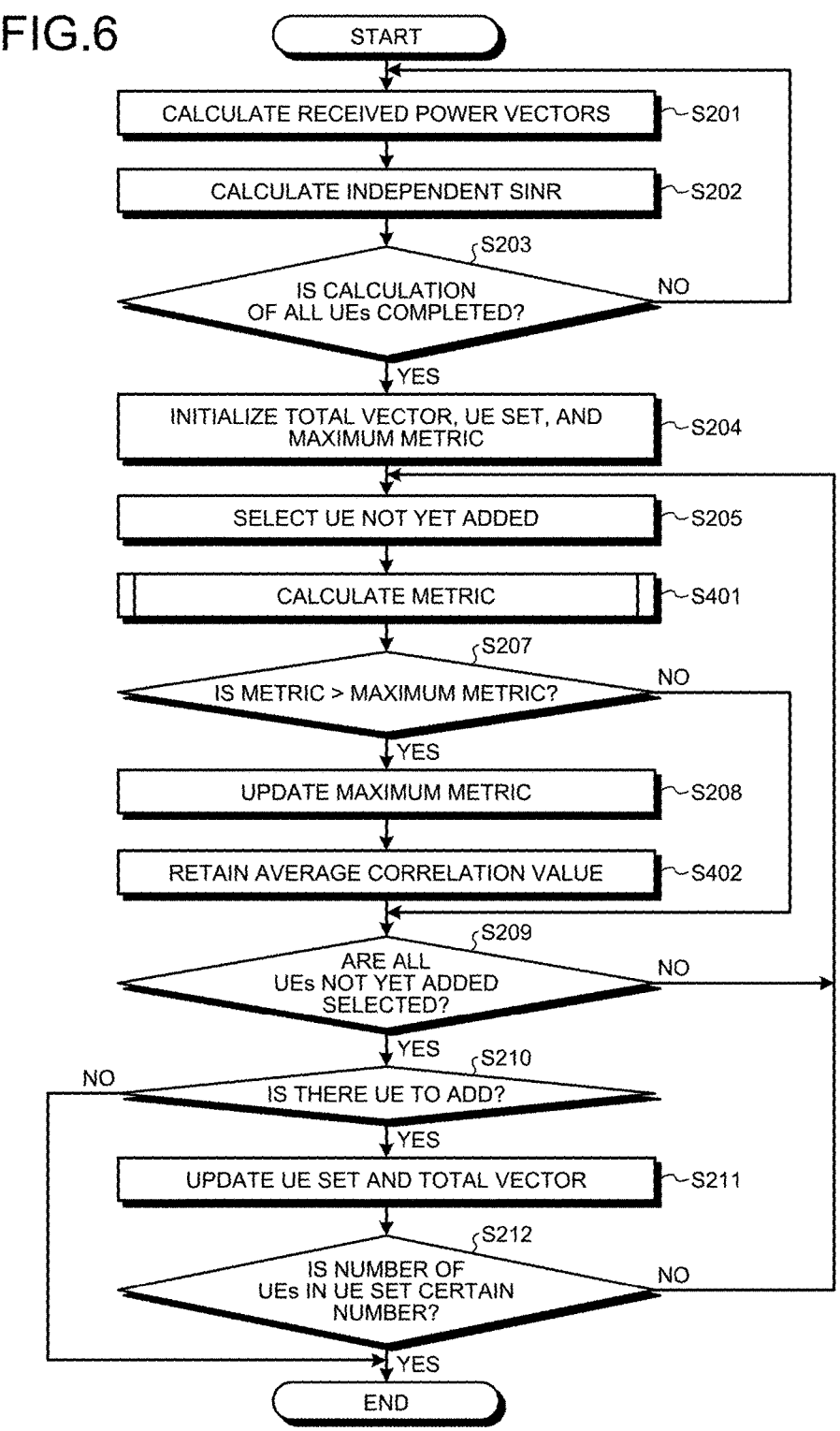

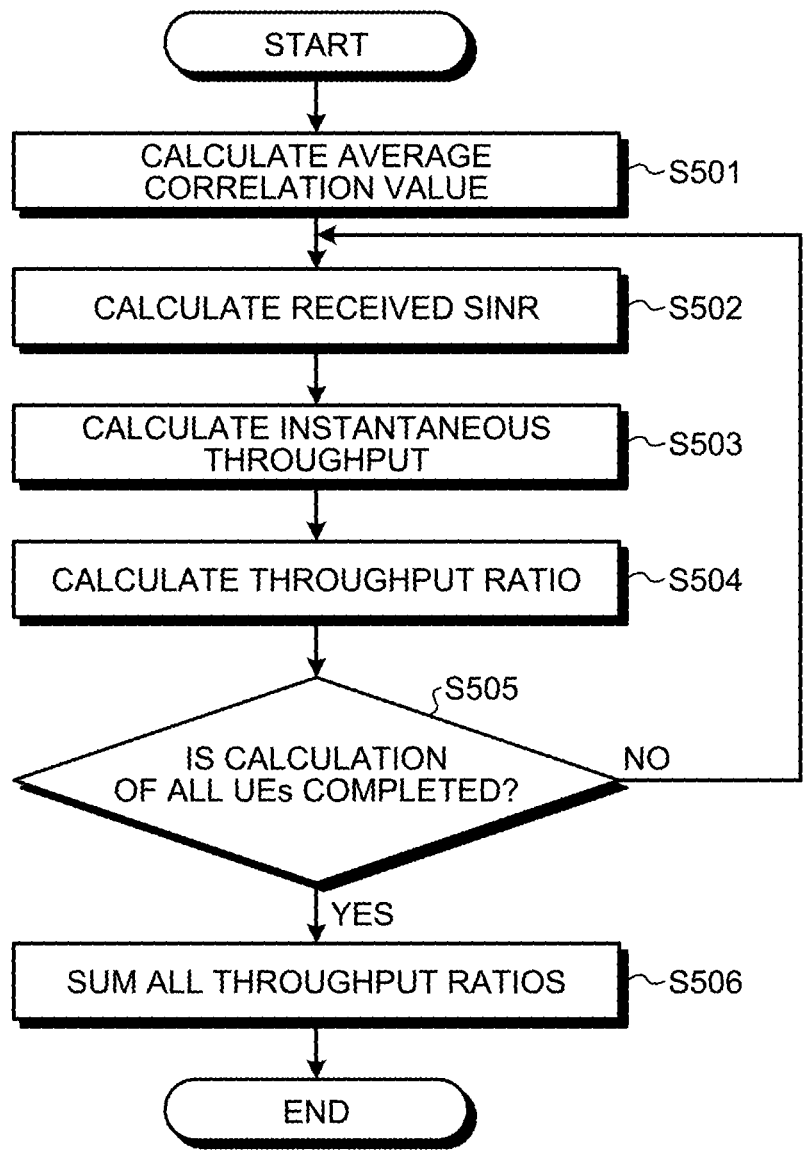

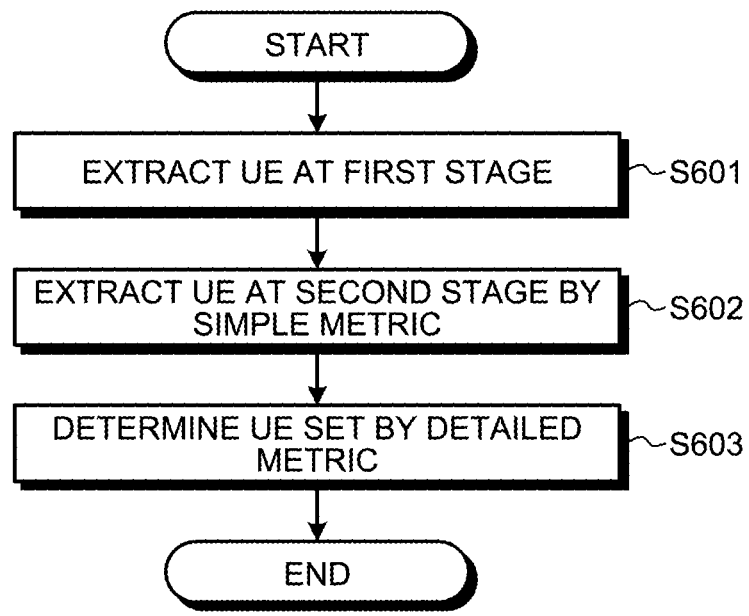

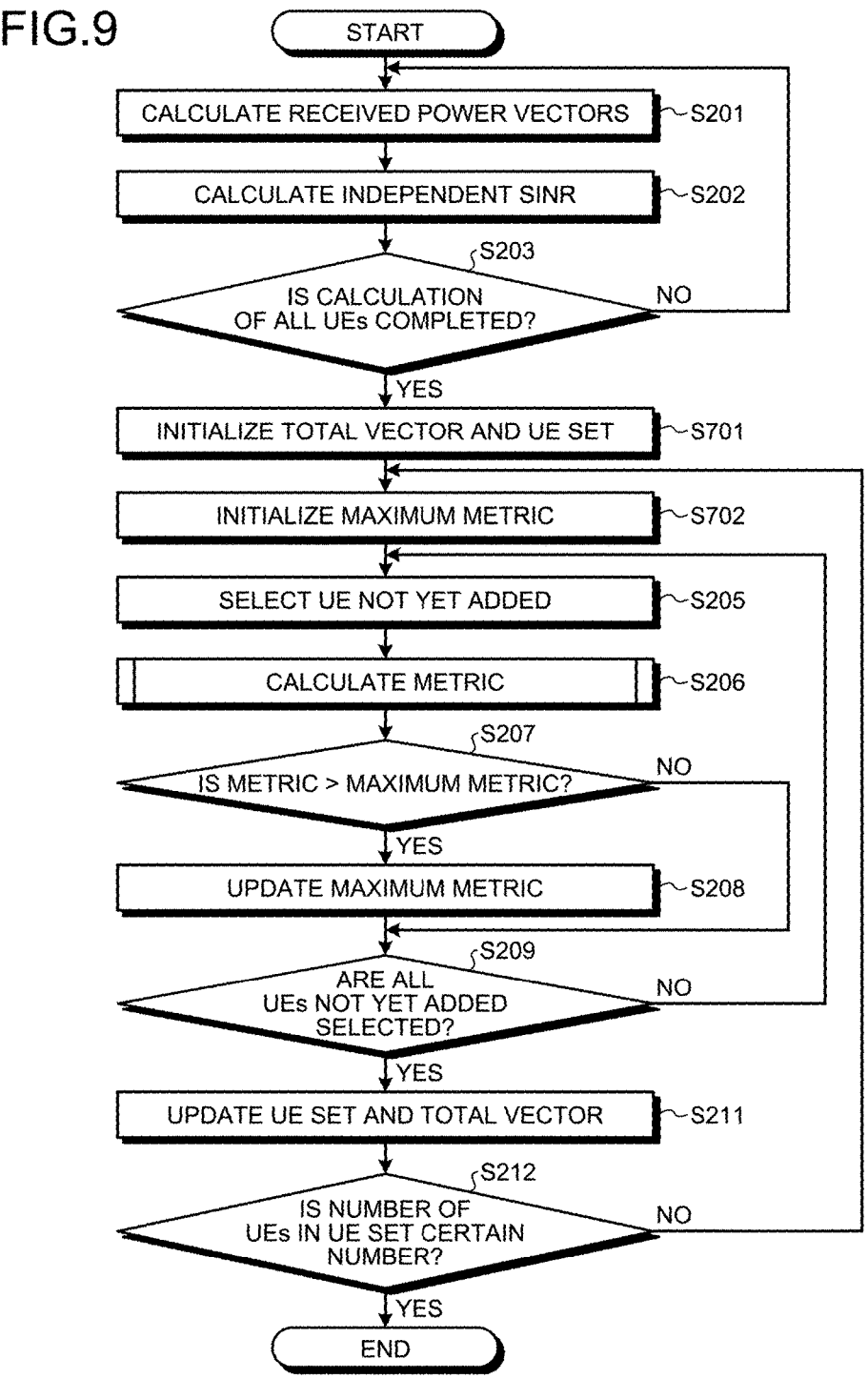

TRANSMISSION CONTROL APPARATUS AND TRANSMISSION CONTROL METHOD

CROSS-REFERENCE TO RELATED APPLICATION

This application is based upon and claims the benefit of priority of the prior Japanese Patent Application No. 2016-198054, filed on Oct. 6, 2016, the entire contents of which are incorporated herein by reference.

FIELD

The embodiments discussed herein are related to a transmission control apparatus and a transmission control method.

BACKGROUND

In recent years, multi-user multiple-input multiple-output (MU-MIMO) in which spatial multiplexing is performed on signals destined for a plurality of user terminal devices (user equipment, hereinafter referred to as "UE") by using an identical radio resource has been attracting attention as a technology to increase capacity. In general, by calculating a transmission weight by the technique referred to as zero-forcing or minimum mean square error (MMSE) by using channel information between transmission antennas and the UEs to be multiplexed and multiplying transmission signals by the transmission weight, the interference among the UEs is reduced. That is, by multiplying the transmission signals by the transmission weight, beams for transmitting signals destined for the respective UEs are formed, and in the beam of the signal destined for a single UE, nulls for which the gain is small are directed to the directions of the other UEs.

However, depending on a combination of the UE to be multiplexed, even when the transmission signals are multiplied by the transmission weight, the nulls may be not directed to the UE mutually and the performance may deteriorate drastically. Accordingly, in MU-MIMO, it is desirable that the combination of the UE to be multiplexed be determined appropriately.

As for the method of determining a combination of the UEs to be multiplexed, there is a method that carries out transmission weight calculation and reception quality estimation on all possible combinations of the UEs and selects the combination for which a certain metric value becomes the largest. In such a method, when the number of UEs is large, the number of combinations of the UEs becomes enormous and a non-realistic computational complexity is needed. Thus, it has been conceived, by adding the UE one by one to the extent that the metric value is increased, to reduce the computational complexity in determining the combination of the UEs to be multiplexed.

Specifically, the reception quality $\gamma_i^{MU}$ of UE#i to be newly added is calculated by the following equation (1), for example.

$$\gamma_i^{MU} = \frac{\gamma_i^{SU}}{|u|+1}\left(1 - \sum_{k \in u} \rho_{i,k}\right) = \frac{\gamma_i^{SU}}{|u|+1}\left(1 - \sum_{k \in u} \frac{|h_i h_k^H|^2}{\|h_i\|^2 \|h_k\|^2}\right) \quad (1)$$

In equation (1), $\gamma_i^{SU}$ represents the reception quality of UE#i when the interference from the other UE is not present, and u represents a set of the UEs that have already been determined to be multiplexed when UE#i is added. $h_i$ is a channel response vector between UE#i and each transmission antenna, and when the channel response between UE#i and a transmission antenna #j is $h_{i,j}$, $h_i$ is a matrix expressed like the following:

$$h_i = [h_{i,1} h_{i,2} \ldots h_{i,N_{tx}}]$$

$N_{tx}$ represents the number of transmission antennas. In equation (1), $h^H$ represents Hermitian transpose of matrix h, |•| represents an absolute value or a set size, and ‖•‖ is a symbol to represent a norm.

The metric value for which UE#i is added is calculated from the reception quality of the above-described equation (1), and when the metric value is increased by adding UE#i, UE#i is to be added to the combination of the UE to be multiplexed. Related art examples are described in Japanese Laid-open Patent Publication No. 2010-193189 and Japanese Laid-open Patent Publication No. 2009-278238, and in non-patent literatures of Jingxiu Liu, et al., *A Low Complexity Capacity-Greedy User Selection Scheme for Zero-Forcing Beamforming*, Vehicular Technology Conference, 2009. VTC Spring 2009, April 2009; of Takashi Seyama, et al., "Study of Coordinated Radio Resource Scheduling Algorithm for 5G Ultra High-Density Distributed Antenna Systems: Performance Evaluation of Joint Transmission Multi-User MIMO", *IEICE technical report*, Vol. 115, No. 472, March 2016; and of Jun Sikida, et al., "Performance Evaluation of Low Complexity Multi-User MIMO Scheduling Schemes for Massive MIMO System", *IEICE technical report*, Vol. 115, No. 472, March 2016.

However, there has been a problem in that, even when the UE is added one by one as in the foregoing, the computational complexity is not sufficiently reduced. That is, in the above-described equation (1), the processing of multiplying the channel response vector $h_i$ of the newly added UE#i by the channel response vector $h_k$ of each UE having already determined to be multiplexed is included. Assuming that UE#i is the m-th added UE and the number |u| of the UE having already determined to be multiplexed is (m−1), the real multiplication of $4 \cdot N_{tx} \cdot (m-1)$ times is performed in determining the addition of UE#i. The number of times of the real multiplication increases as the number of antennas $N_{tx}$ and the number of UEs to be multiplexed become large, and the growth of computational complexity can no longer be ignored. Consequently, as the result of the growth in computational complexity, the growth in the circuit scale also results.

SUMMARY

According to an aspect of an embodiment, a transmission control apparatus determines a group of terminal devices that are destinations to which signals are simultaneously transmitted out of a plurality of terminal devices. The transmission control apparatus includes a processor that executes a process including: calculating received power vectors corresponding to received power of the respective terminal devices; determining, based on an inner product between a received power vector of a first terminal device that is determined to belong to the group of terminal devices already and a received power vector of a second terminal device that is a candidate to be newly added to the group of terminal devices, whether to add the second terminal device to the group of terminal devices; and generating transmission signals to be transmitted to a group of terminal devices that are determined in accordance with determination at the determining.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a flowchart illustrating a transmission method according to the first embodiment;

FIG. 4 is a flowchart illustrating UE-set determination processing according to the first embodiment;

FIG. 5 is a flowchart illustrating metric calculation processing according to the first embodiment;

FIG. 6 is a flowchart illustrating UE-set determination processing according to a third embodiment;

FIG. 7 is a flowchart illustrating metric calculation processing according to the third embodiment;

FIG. 8 is a flowchart illustrating UE-set determination processing according to a fourth embodiment; and FIG. 9 is a flowchart illustrating UE-set determination processing according to a fifth embodiment.

DESCRIPTION OF EMBODIMENTS

Preferred embodiments of the present invention will be explained with reference to accompanying drawings. Note that the invention is not limited by the embodiments.

[a] First Embodiment

Figure 1:
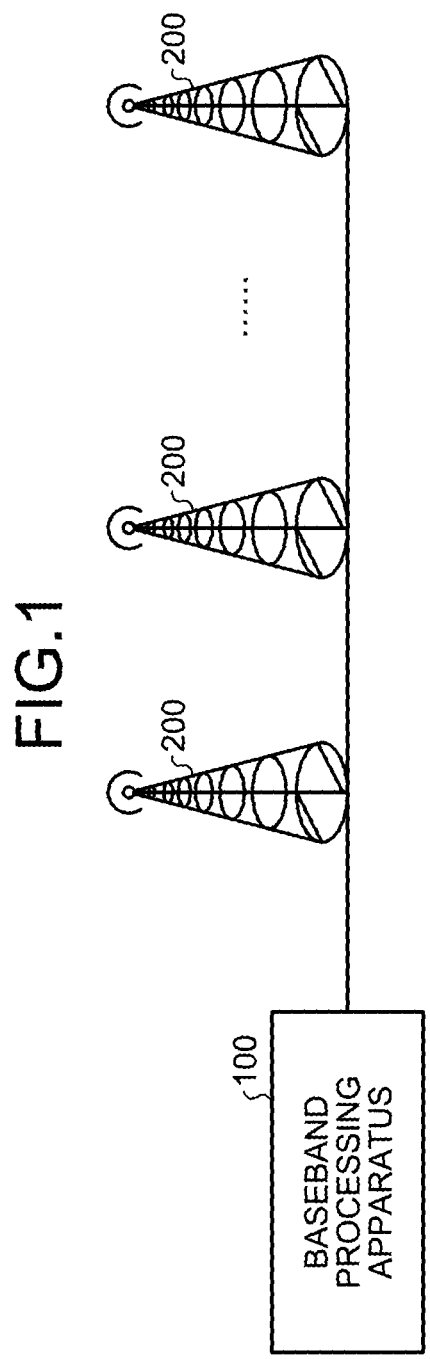
FIG. 1 is a diagram illustrating a configuration of a radio communications system according to a first embodiment.

FIG. 1 is a diagram illustrating a configuration of a radio communications system according to a first embodiment. As illustrated in FIG. 1, the radio communications system includes a baseband processing apparatus 100 and a plurality of remote radio heads (RRHs) 200.

The baseband processing apparatus 100 generates transmission signals that are transmitted from the RRHs 200 destined for UEs not depicted, and transmits the generated transmission signals from the respective RRHs 200. At this time, the baseband processing apparatus 100 determines the combination of the UEs to be the destinations of the signals transmitted simultaneously from transmission antennas of the respective RRHs 200 at an identical frequency. That is, the baseband processing apparatus 100 determines the combination of the UEs (hereinafter referred to as "UE set") that are the destinations of the signals to be spatially multiplexed, multiplies the signals to be transmitted to the UE set by a transmission weight, and outputs the resultant to the RRHs 200. The baseband processing apparatus 100 successively determines, by using the vectors of received power (hereinafter referred to as "received power vectors") of the respective UEs, the UE to be added to the UE set. By performing the calculation by using the received power vectors in this manner, the baseband processing apparatus 100 can reduce the computational complexity in determining the UE set. The specific configuration and the operation of the baseband processing apparatus 100 will be described in detail later.

The RRHs 200 are each coupled to the baseband processing apparatus 100 and include a single transmission antenna. The RRH 200 carries out wireless transmission of the transmission signal transmitted from the baseband processing apparatus 100 from the transmission antenna. The RRH 200 receives a signal including a known reference signal from the UE not depicted and transmits it to the baseband processing apparatus 100.

Figure 2:
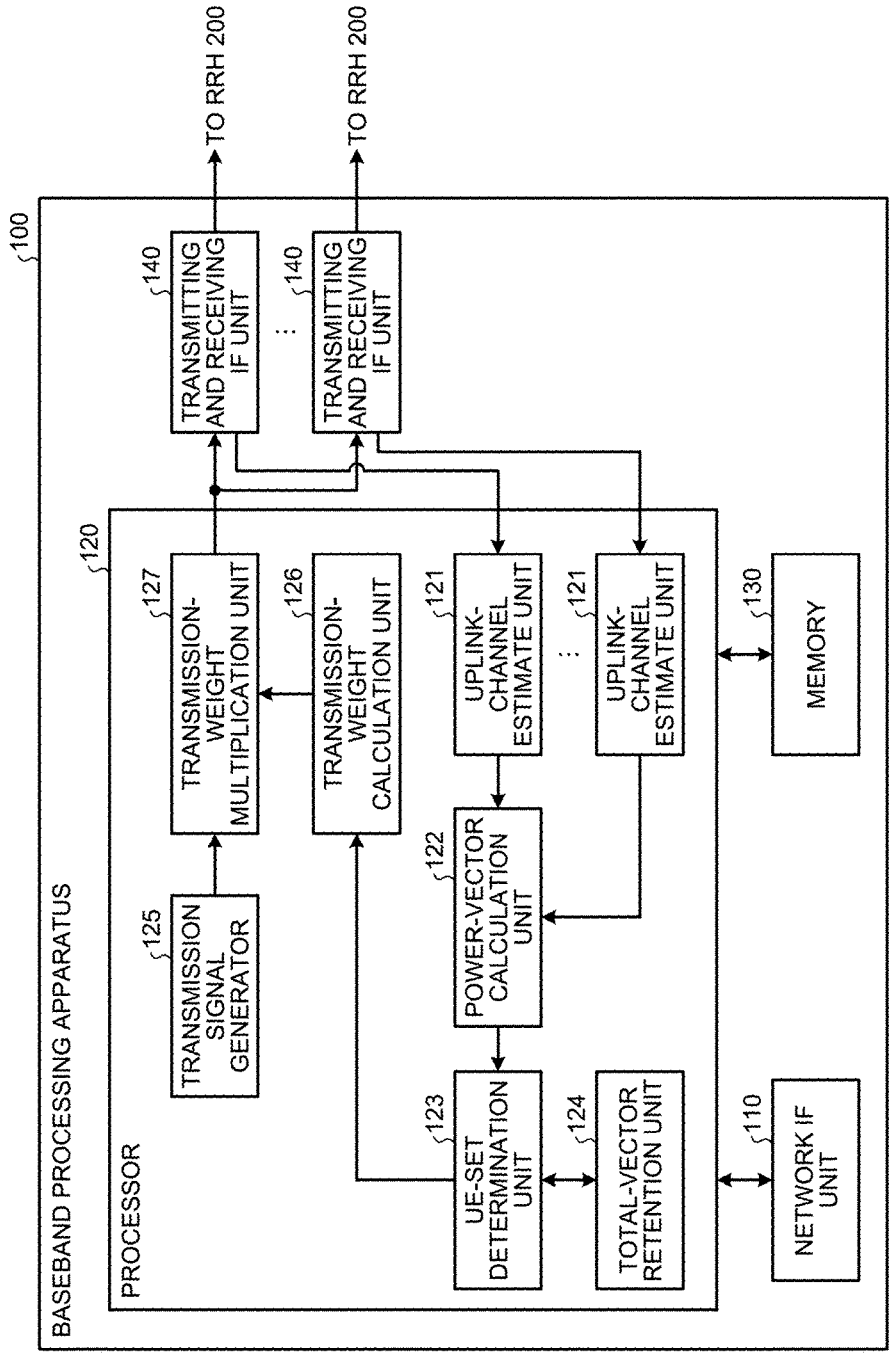
FIG. 2 is a block diagram illustrating a configuration of a baseband processing apparatus according to the first embodiment.

FIG. 2 is a block diagram illustrating the configuration of the baseband processing apparatus 100 in the first embodiment. The baseband processing apparatus 100 illustrated in FIG. 2 includes a network interface unit (hereinafter abbreviated to "network IF unit") 110, a processor 120, a memory 130, and a plurality of transmitting and receiving interface units (hereinafter abbreviated to "transmitting and receiving IF units") 140.

The network IF unit 110 is an interface that couples to a higher-level device such as a gateway device of a backbone network, for example.

The processor 120 includes a central processing unit (CPU), a field programmable gate array (FPGA), a digital signal processor (DSP), and the like and executes a variety of type of processing by using the memory 130. Specifically, the processor 120 includes uplink-channel estimate units 121, a power-vector calculation unit 122, a UE-set determination unit 123, a total-vector retention unit 124, a transmission signal generator 125, a transmission-weight calculation unit 126, and a transmission-weight multiplication unit 127.

The uplink-channel estimate units 121 are each coupled to the transmitting and receiving IF unit 140 and, by using a received signal from the UE received by the transmitting and receiving IF unit 140, perform the channel estimate of the uplink channel going toward the RRH 200 from each of the UEs. Specifically, the uplink-channel estimate unit 121 obtains, by using a reference signal such as a demodulation reference signal (DMRS) or a sounding reference signal (SRS) included in the received signal, a channel estimated value of an uplink channel for each combination of the UE and the transmission antenna of the RRH 200. In other words, the uplink-channel estimate unit 121 calculates a channel estimated value $h'_{i,j}$ of the uplink channel between UE#i and RRH#j.

The power-vector calculation unit 122 calculates a received power vector indicative of the received power from a plurality of RRHs 200 in each UE. Specifically, the power-vector calculation unit 122 first obtains, based on the channel estimated value of the uplink channel, a channel estimated value of a downlink channel going toward the UE from the transmission antenna of the RRH 200. That is, the power-vector calculation unit 122 calculates a channel estimated value $h_{i,j}$ of the downlink channel between UE#i and RRH#j by the following equation (2).

$$h_{i,j} = \sqrt{\frac{P_{TP}}{P_{UE}}} h'_{i,j} \qquad (2)$$

In equation (2), $P_{TP}$ represents the transmission power of RRH#j, and $P_{UE}$ represents the transmission power of UE#i. Note that, only when the time division duplex (TDD) in which the uplink channel and the downlink channel have symmetry is employed in the radio communications system, the channel estimated value of the downlink channel can be calculated by equation (2). In a radio communications system in which the frequency division duplex (FDD) is used, the power-vector calculation unit 122 may acquire the channel estimated value of the downlink channel that is reported from each UE, for example.

The power-vector calculation unit 122 then assumes the square of the absolute value of the channel estimate value $h_{i,j}$ of the downlink channel as a received power $p_{i,j}$ from RRH#j in UE#i, and calculates a received power vector $p_i$ of UE#i as in the following equation (3).

$$p_i = \frac{1}{\sum_{j=1}^{N_{TP}} p_{i,j}} [p_{i,1} \quad p_{i,2} \quad \cdots \quad p_{i,N_{TP}}] \quad (3)$$

In equation (3), $N_{TP}$ represents the number of RRHs 200, and in the first embodiment, and is equal to the number of transmission antennas because the RRHs 200 have one transmission antenna each.

The UE-set determination unit 123 determines, by using the received power vector of each UE calculated by the power-vector calculation unit 122, the combination of the UEs (UE set) that are the destinations of the signals to be spatially multiplexed. That is, the UE-set determination unit 123 calculates a received signal-to-interference-and-noise ratio (SINR) of each UE corresponding to the inner product between the received power vector of the UE having already determined to be multiplexed and the received power vector of the UE to be newly added, and from the received SINR of each UE, calculates the metric indicative of the throughput for which the UE is newly added. The UE-set determination unit 123 then determines the UE set with the combination of the UEs that makes the metric the largest.

Specifically, the UE-set determination unit 123 acquires a total vector that is a sum of the received power vectors of the UEs that already belong to the UE set from the total-vector retention unit 124 and calculates the received SINR of each UE that corresponds to the inner product between the total vector and the received power vector of the UE that is a candidate of being added to the UE set. The UE-set determination unit 123 then determines whether the metric that is obtained from the received SINR of each UE increases when the UE of addition candidate is added to the UE set, and it determines to add the UE of addition candidate to the UE set when the merit increases. As just described, the UE-set determination unit 123 determines the UE set that makes the metric the largest, by the calculation using the inner product of the received power vectors. The UE-set determination processing and the metric calculation processing performed by the UE-set determination unit 123 will be described in detail later.

The total-vector retention unit 124 retains the total vector that is obtained by adding the received power vectors of the UEs that already belong to the UE set. Then, the total-vector retention unit 124, each time a new UE is added to the UE set by the UE-set determination unit 123, updates the total vector by adding the received power vector of the UE to be added to the total vector. Furthermore, in performing the UE-set determination processing by the UE-set determination unit 123, the total-vector retention unit 124 outputs the total vector to the UE-set determination unit 123 as needed.

The transmission signal generator 125 generates transmission signals to be transmitted from the RRHs 200 to the respective UEs. That is, the transmission signal generator 125 generates the transmission signal by encoding and modulating transmission data destined for each UE.

The transmission-weight calculation unit 126 generates a concatenated channel matrix by concatenating a channel estimated value of each UE belonging to the UE set that has been determined by the UE-set determination unit 123 and, based on the concatenated channel matrix, calculates a transmission weight.

The transmission-weight multiplication unit 127 multiplies the transmission signals generated by the transmission signal generator 125 by the transmission weight generated by the transmission-weight calculation unit 126. The transmission-weight multiplication unit 127 then transmits the transmission signals after the transmission weight multiplication to the respective RRHs 200 from the transmitting and receiving IF units 140.

The memory 130 includes, for example, a random access memory (RAM) and a read only memory (ROM) and stores therein a variety of types of information used in the processing performed by the processor 120.

The transmitting and receiving IF units 140 are each coupled to the RRH 200, and are configured to transmit the transmission signal generated by the processor 120 to the RRH 200 and to receive from the RRH 200 the received signal that is received from the UE by the RRH 200.

Next, the transmission method performed by the baseband processing apparatus 100 thus configured will be described with reference to the flowchart illustrated in FIG. 3.

Each UE not depicted transmits a signal including the reference signal to the RRHs 200, and this signal is received by the RRHs 200. Then, the received signal in the RRH 200 is transmitted to the baseband processing apparatus 100 from the RRH 200, and is received by the transmitting and receiving IF units 140 coupled to the respective RRHs 200 (Step S101).

When the signal is received by the transmitting and receiving IF unit 140, a channel estimated value of each uplink channel between the UE and the RRH 200 is obtained by the uplink-channel estimate unit 121 (Step S102). That is, the reference signal included in the received signal is used, and the channel estimated value of the uplink channel is thereby obtained for each combination of the UE and the RRH 200.

The obtained channel estimated value is output to the power-vector calculation unit 122, and by the power-vector calculation unit 122, the received power vector indicative of the received power from each of the RRHs 200 for each UE is calculated (Step S103). That is, from the channel estimated value $h'_{i,j}$ of the uplink channel between UE#i and RRH#j, the channel estimated value $h_{i,j}$ of the downlink channel between UE#i and RRH#j is calculated, and from the channel estimated value $h_{i,j}$, the received power $p_{i,j}$ from RRH#j in UE#i is obtained. Then, on UE#i, the received power from all RRHs 200 of $N_{TP}$ pieces are arranged as in the above-described equation (3), and thus the received power vector $p_i$ concerning UE#i is calculated.

The received power vector for each UE indicates the received power from all RRHs 200 in each UE, and between the UEs of which the received power vectors are orthogonal to each other, the correlation in propagation paths is low and the interference given to each other is small. Accordingly, by combining, as a UE set, the UEs of which the received power vectors are close to being orthogonal, it is possible to suppress the interference among the UEs even when the signals for the UEs belonging to the UE set are spatially multiplexed. Thus, by the UE-set determination unit 123, the determination of the UE set based on the inner product of the received power vectors is carried out (Step S104).

Specifically, by the UE-set determination unit 123, a total vector that is a sum of the received power vectors of the UEs that already belong to the UE set is acquired, and the received SINR that corresponds to the inner product between the total vector, and the received power vector of the UE of addition candidate to the UE set is calculated. This received SINR becomes a larger value, as the total vector and the received power vector are closer to being orthogonal and the inner product thereof is closer to zero. Then, by the UE-set determination unit 123, the metric corresponding to the throughput for which the UE of addition candidate is added to the UE set is calculated based on the received SINR for each UE. When the metric increases more than before the UE of addition candidate is added, it is determined to add the UE of addition candidate to the UE set.

As just described, the UE is successively added to the UE set such that the metric based on the inner product of the received power vectors increases, and the UE set that makes the metric the largest is determined. Then, based on the concatenated channel matrix in which the channel estimated values concerning the UEs belonging to the determined UE set are concatenated, the transmission weight in transmitting the signal to each UE of the UE set is calculated by the transmission-weight calculation unit 126 (Step S105).

Specifically, the concatenated channel matrix H obtained from the channel estimated values of UE of |u| pieces that belong to the UE set becomes like the following, for example:

$$H = \begin{bmatrix} h_{u(1),1} & \cdots & h_{u(1),N_{TP}} \\ \vdots & \ddots & \vdots \\ h_{u(|u|),1} & \cdots & h_{u(|u|),N_{TP}} \end{bmatrix}$$

The transmission weight W using the concatenated channel matrix H is obtained in the following way, for example:

$$W = H^H(HH^H)^{-1}D$$

The matrix D is a diagonal matrix for adjusting the power of the transmission weight W, and when the column vector of the n-th column of the matrix $H^H(HH^H)^{-1}$ is $w_{tmp,n}$ and the total of the transmission power of the downlink channel of each RRH 200 is $P_{total}$, the matrix D can be expressed like the following:

$$D = \sqrt{\frac{P_{total}}{|u|}} \text{diag}\left\{\frac{1}{\|w_{tmp,1}\|}, \cdots, \frac{1}{\|w_{tmp,|u|}\|}\right\}$$

The diag{ } represents the diagonal components of the diagonal matrix. When the UE set is thus determined, the transmission weight is calculated from the concatenated channel matrix in which the channel estimated values of the UEs belonging to the UE set are concatenated.

Meanwhile, by the transmission signal generator 125, the transmission signals destined for the respective UEs belonging to the UE set are generated (Step S106). That is, the pieces of transmission data destined for the respective UEs belonging to the UE set are encoded and modulated, and thus the transmission signals are generated. Then, by the transmission-weight multiplication unit 127, the transmission signals are multiplied by the transmission weight (Step S107), and the transmission signals after the transmission weight multiplication are transmitted to the RRHs 200 from the respective transmitting and receiving IF units 140 (Step S108).

The transmission signals are wirelessly transmitted simultaneously from the RRHs 200 at an identical frequency, and are received by the UEs belonging to the UE set. At this time, because the transmission signals are multiplied by the transmission weight, the interference by the signals destined for the other UEs is suppressed. The actually received SINR $\gamma^{MCS}_{u(k)}$ of UE#k for which the transmission weight calculated as in the foregoing is used is obtained by the following equation (4), where the noise power of UE#k is denoted by $N_{u\{k\}}$.

$$\gamma^{MCS}_{u(k)} = \frac{P_{total}}{\|w_{tmp,k}\|^2 |u| N_{u(k)}} \quad (4)$$

In generating the transmission signals by the transmission signal generator 125, the encoding ratio and modulation method of the transmission data destined for each UE may be determined based on the received SINR of the above-described equation (4).

Next, the UE-set determination processing in the first embodiment will be specifically described with reference to the flowchart illustrated in FIG. 4. The UE-set determination processing illustrated in FIG. 4 is mainly carried out by the power-vector calculation unit 122, the UE-set determination unit 123, and the total-vector retention unit 124.

First, from the channel estimated value of the uplink channel, the received power vectors of the respective UEs are calculated by the power-vector calculation unit 122 (Step S201). In a radio communications system that employs TDD, the channel estimated value of the uplink channel can be converted into the channel estimated value of the downlink channel by the above-described equation (2). Accordingly, by the power-vector calculation unit 122, from the channel estimated value $h'_{i,j}$ of the uplink channel between UE#i and RRH#j, the channel estimated value $h_{i,j}$ of the downlink channel is obtained. In a radio communications system that employs FDD, the channel estimated value $h_{i,j}$ of the downlink channel that is reported from each UE may be acquired by the power-vector calculation unit 122.

When the channel estimated value $h_{i,j}$ of the downlink channel is obtained, the absolute value of this channel estimated value $h_{i,j}$ is squared, and thus the received power $p_{i,j}$ from RRH#j in UE#i is obtained. Then, based on the received power $p_{i,j}$, the received power vector $p_i$ of UE#i expressed by the above-described equation (3) is calculated. By the UE-set determination unit 123, based on the received power $p_{i,j}$, the received SINR (hereinafter referred to as "independent SINR") of UE#i for which the interference from the other UEs is not taken into consideration is calculated (Step S202). That is, by the following equation (5), the independent SINR $\gamma^{SU}_i$ when there are no signals destined for the UEs other than UE#i is calculated.

$$\gamma^{SU}_i = \frac{\sum_{j=1}^{N_{TP}} p_{i,j}}{N_i} \quad (5)$$

In equation (5), $N_i$ represents the noise power of UE#i, and a value measured by UE#i and reported, a predetermined set value, and the like can be used, for example. On UE#i, when the received power vector $p_i$ and the independent SINR $\gamma^{SU}_i$ are thus calculated, it is determined whether the received power vectors and the independent SINRs have been calculated on all UEs (Step S203). When there is a UE not yet calculated (No at Step S203), the calculation of the received power vector and the independent SINR is repeated.

Then, when the received power vectors and the independent SINRs have been calculated on all UEs (Yes at Step S203), the total vector, the UE set, and the maximum metric are initialized by the UE-set determination unit 123 and the total-vector retention unit 124 (Step S204). That is, the UE set that is a combination of the UEs to be the destinations of the signals spatially multiplexed is made to be an empty set, and the total vector that is a sum of the received power vectors of the UEs belonging to the UE set is initialized to the zero vector. The maximum metric that is the maximum value of the metric calculated based on the throughput is initialized to zero.

After the initialization of the respective parameters, the metric for which each UE is added to the UE set is calculated. When there is a UE that increases the metric more than before the UE is added, the processing of adding the relevant UE to the UE set is repeated. Specifically, by the UE-set determination unit 123, a single UE that is not yet added to the UE set is selected (Step S205), and the selected UE becomes an addition candidate to the UE set. Then, the metric corresponding to the throughput for which the UE of addition candidate is added to the UE set is calculated (Step S206). In calculating the metric, by using the inner product between the total vector that is a sum of the received power vectors of the UEs that already belong to the UE set, and the received power vector of the UE of addition candidate, the received SINR of each UE is calculated. Then, based on the received SINR, the metric corresponding to the throughput for which the UE of addition candidate is added is calculated. The metric calculation processing will be described in detail later.

When the metric for which the UE of addition candidate is added is calculated, the calculated metric and the maximum metric are compared (Step S207). As a result of this comparison, when the calculated metric is greater (Yes at Step S207), the calculated metric becomes the new maximum metric (Step S208). Meanwhile, when the calculated metric is equal to or less than the maximum metric (No at Step S207), the maximum metric is not updated.

In this way, when the calculation of the metric when one UE of addition candidate is selected is completed, it is determined whether all UEs that are not yet added to the UE set have been selected (Step S209). As a result of this determination, when there is a UE that is not yet selected (No at Step S209), one UE that is not yet added to the UE set is selected again (Step S205), and the calculation of the metric and the updating of the maximum metric are carried out (Step S206 to Step S208).

Then, when all UEs that are not yet added to the UE set are selected as the addition candidate one by one and the calculation of the metric is completed (Yes at Step S209), it is determined whether there is any UE that updated the maximum metric in the UEs selected as the addition candidate (Step S210). That is, when the calculated metric for which any UE of the addition candidates is added is the maximum metric, the metric increases by adding the UE that corresponds to this maximum metric to the UE set. Thus, it is determined whether the UE that contributed to the updating of the maximum metric is included in the UEs selected as the addition candidates. If not included (No at Step S210), it is determined that the current UE set is the ultimate UE set without adding the UE newly.

Meanwhile, when the UE that contributed to the updating of the maximum metric is included in the UEs selected as the addition candidates (Yes at Step S210), the UE that corresponds to the current maximum metric is added to the UE set. That is, even when there are a plurality of UEs that contributed to the updating of the maximum metric, one UE that maximizes the metric is newly added to the UE set. Then, along with the updating of the UE set, the total vector that is the sum of the received power vectors of the UE belonging to the UE set is updated (Step S211), and the total vector after having updated is retained by the total-vector retention unit 124.

When the UE is newly added to the UE set, by the UE-set determination unit 123, it is determined whether the number of the UEs belonging to the UE set has reached a certain number (Step S212). The certain number is at most the number of RRHs 200, $N_{TP}$, that equals to the number of transmission antennas. As a result of this determination, when the number of UEs belonging to the UE set has reached the certain number (Yes at Step S212), it is determined that the current UE set is the ultimate UE set. When the number of UEs belonging to the UE set has not reached the certain number (No at Step S212), the UE that is not yet added to the UE set is selected again one by one and the determination of whether there is any UE that increases the metric is repeated (Step S205 to Step S210).

As just described, the metric based on the inner product between the total vector of the received power of the UEs that already belong to the UE set and the received power vector of the UE of addition candidate to the UE set is calculated, and the UE of addition candidate that increases the metric is added to the UE set. Thus, it is possible to determine the UE set that maximizes the metric and it is possible to improve the throughput. In calculating the metric, not the multiplication of the channel response vectors but the multiplication of the received power vectors is carried out. The received power vector is a vector for which elements are of real values, and in calculating the inner product between the total vector and the received power vector, the real multiplication is carried out the number of times the same as the number of elements of the received power vector. As a result, as compared with the calculation of the metric by the multiplication of the channel response vector, it is possible to reduce the computational complexity for the metric calculation.

Next, the metric calculation processing in the first embodiment will be specifically described with reference to the flowchart illustrated in FIG. 5. The following metric calculation processing is carried out when one UE of addition candidate is selected by the UE-set determination unit 123.

First, the received SINR for the UEs of addition candidate when the UE of addition candidate is added to the UE set is calculated (Step S301). On UE#i to be newly added, not the independent SINR $\gamma^{SU}_i$ expressed by the above-described equation (5) but the received SINR $\gamma^{MU}_i$ that the interference among the UEs belonging to the UE set is taken into consideration is calculated by the following equation (6).

$$\gamma^{MU}_i = \frac{\gamma^{SU}_i}{|u|+1}(1 - p_{sum} \cdot p_i^T) \qquad (6)$$

In equation (6), |u| represents the number of UEs that already belong to the UE set, and $p_{sum}$ represents the total vector. $p_i^T$ represents the transpose vector of the received power vector $p_i$. As is apparent from equation (6), as the inner product between the total vector $p_{sum}$ and the received power vector $p_i$ of UE#i is closer to zero, the received SINR $\gamma^{MU}_i$ in UE#i becomes larger. That is, as the total vector $p_{sum}$ and the received power vector $p_i$ of the UE of addition candidate are closer to being orthogonal, the reception quality in the UE of addition candidate is higher.

When the received SINR $\gamma^{MU}_i$ of the UE of addition candidate is calculated, this received SINR $\gamma^{MU}_i$ is converted into an instantaneous throughput (Step S302). Specifically, by a function such as Shannon capacity, the received SINR $\gamma^{MU}_i$ is converted into the instantaneous throughput, for example. The conversion of the received SINR $\gamma^{MU}_i$ into the instantaneous throughput may be carried out by using a certain table or the like that stores therein the received SINR in association with the instantaneous throughput in advance.

Then, a ratio of the instantaneous throughput of the UE of addition candidate and an average throughput is calculated as a metric concerning the UE of addition candidate (Step S303). That is, the metric $M_i$ concerning the UE of addition candidate is calculated by the following equation (7).

$$M_i = \frac{T(\gamma_i^{MU})}{t_i} \quad (7)$$

In equation (7), T( ) is the function to convert the received SINR into the instantaneous throughput, and $t_i$ represents the average throughput concerning the UE of addition candidate. The average throughput is an average of throughput in a certain time unit, and because the UE that has a higher frequency of belonging to the UE set can receive a signal with a higher frequency, the average throughput becomes higher. Specifically, the average throughput $t_i$ is calculated by the following equation (8) for each certain time unit such as a sub-frame, for example.

$$t_i = \begin{cases} \alpha t_i + (1-\alpha) \; T(\gamma_i^{MCS}) & (i \in u) \\ \alpha t_i & (i \notin u) \end{cases} \quad (8)$$

In equation (8), $\alpha$ is a forgetting factor for each time unit and is of a value greater than zero but below one. $\gamma^{MCS}_i$ represents the actual received SINR of UE#i in the relevant time unit and is calculated in the same manner as the above-described equation (4). Accordingly, the average throughput of UE#i, if UE#i belongs to the UE set in the relevant time unit, becomes a value obtained by adding the throughput, which corresponds to the actual received SINR of the relevant time unit, to the value obtained by multiplying the average throughput of an immediately previous time unit by the forgetting factor.

Meanwhile, also on the UEs that already belong to the UE set, the metrics for which each UE of addition candidate is added to the UE set are calculated. That is, at the time the UE of addition candidate was first selected, one UE that already belongs to the UE set is selected (Step S304). Then, the received SINR of the selected UE when the UE of addition candidate is added to the UE set is calculated (Step S305). Specifically, on UE#k that already belongs to the UE set, the received SINR $\gamma^{MU}_k$ that the interference among the UEs belonging to the UE set is taken into consideration is calculated by the following equation (9).

$$\gamma_k^{MU} = \frac{\gamma_{u(k)}^{MU}}{|u|+1}(1 - (p_{sum} + p_i - p_{u(k)}) \cdot p_{u(k)}^T) \quad (9)$$

In equation (9), $\gamma^{SU}_{u(k)}$ represents the independent SINR of UE#k, and $p_{u(k)}$ represents the received power vector of UE#k. As is apparent from equation (9), as the inner product between the sum of the received power vectors of the UE other than UE#k and the received power vector of UE#k is closer to zero, the received SINR $\gamma^{MU}_k$ of UE#k becomes larger. That is, as the sum of the received power vectors of the UE other than UE#k and the received power vector of UE#k is closer to being orthogonal, the reception quality of UE#k is higher.

When the received SINR $\gamma^{MU}_k$ of UE#k is calculated, this received SINR $\gamma^{MU}_k$ is converted into the instantaneous throughput (Step S306). Specifically, by a function such as Shannon capacity, the received SINR $\gamma^{MU}_k$ is converted into the instantaneous throughput, for example.

Then, the ratio of the instantaneous throughput of UE#k and the average throughput is calculated as a metric concerning UE#k (Step S307). That is, the metric $M_{u(k)}$ concerning UE#k is calculated by the following equation (10).

$$M_{u(k)} = \frac{T(\gamma_k^{MU})}{t_{u(k)}} \quad (10)$$

In equation (10), $t_{u(k)}$ represents the average throughput concerning UE#k and is obtained in the same manner as the above-described equation (8). When the metric concerning UE#k is thus calculated, it is determined whether the calculation of the metrics on all UEs that already belong to the UE set has been completed (Step S308). As a result of this determination, when there is a UE for which the metric is not yet calculated (No at Step S308), one appropriate UE is selected and the calculation of the metric is repeated (Step S304 to Step S307).

Subsequently, when the metrics on the UE of addition candidate and on all UEs that already belong to the UE set are calculated (Yes at Step S308), the metric when the UE of addition candidate is added to the UE set is calculated, by summing these metrics (Step S309). As described above, when this metric is greater than the maximum metric, the maximum metric is updated, and the UE corresponding to the ultimate maximum metric after all UEs are determined to be the addition candidates is added to the UE set.

As in the foregoing, according to the first embodiment, the metric based on the inner product between the total vector of the received power of the UEs that already belong to the UE set and the received power vector of the UE of new addition candidate is calculated, and the UE of addition candidate that increases the metric is added to the UE set. Thus, in calculating the metric for determining the UE set, it only needs to carry out the multiplication of the received power vectors for which elements are of real values, and thus it is possible to reduce the number of times of the real multiplication and to reduce the computational complexity.

In the above-described first embodiment, the UE set has been determined such that the metric for which the throughput ratio of the UEs that already belong to the UE set and the throughput ratio of the UE of addition candidate are summed becomes the largest. However, as the metric used for the determination of the UE set, the throughput ratio itself of the UE of addition candidate may be used, for example. That is, the UE of addition candidate that maximizes the metric $M_i$ that is expressed by the above-described equation (7) may be added to the UE set. This makes it unnecessary to calculate the metric concerning the UEs that already belong to the UE set, and makes it possible to further reduce the computational complexity.

[b] Second Embodiment

The feature of a second embodiment is the point that each RRH includes a plurality of transmission antennas and that the beams are formed for each RRH.

The configurations of a radio communications system and a baseband processing apparatus according to the second embodiment are the same as those in the first embodiment, and thus the explanations thereof are omitted. In the second embodiment, the point that each RRH includes a plurality of transmission antennas and that transmitting and receiving beams are formed is different from the first embodiment. That is, it is assumed that RRH#j includes transmission antennas of $M_j$ pieces, and forms the transmitting and receiving beams of $L_j$ types, for example. It is then assumed that a transmitting and receiving weight when RRH#j forms the first transmitting and receiving beam out of the transmitting and receiving beams of $L_j$ types is $b_{j,1}$ and that a channel estimated value of the uplink channel between UE#i and RRH#j when the transmitting and receiving weight $b_{j,1}$ is being set, is $h'_{i,j,1}$. In this case, a channel estimated value $h_{i,j,1}$ of a downlink channel that the power-vector calculation unit 122 calculates becomes like the following equation (11).

$$h_{i,j,l} = \sqrt{\frac{P_{TP}}{P_{UE}L_j}}\, h'_{i,j,l} \quad (11)$$

At this time, the received power vector $p_i$ of UE#i that the power-vector calculation unit 122 calculates becomes like the following equation (12).

$$p_i = \frac{1}{\sum_{j=1}^{N_{TP}}\sum_{l=1}^{L_j} p_{i,j,l}}\, [\, p_{i,1,1}\ \ p_{i,1,2}\ \cdots\ p_{i,1,L_1}\ \ p_{i,2,1}\ \cdots\ p_{i,N_{TP},L_{N_{TP}}}\,] \quad (12)$$

In equation (12), as the receiving power the square of the absolute value of the channel estimated value $h_{i,j,1}$ of the downlink channel can be used. Furthermore, the independent SINR $\gamma^{SU}_i$ when there are no signals destined for the UE other than UE#i is calculated by the following equation (13).

$$\gamma^{SU}_i = \frac{\sum_{j=1}^{N_{TP}}\sum_{l=1}^{L_j} p_{i,j,l}}{N_i} \quad (13)$$

In the second embodiment, by using the above-described received power vector $p_i$ and the independent SINR $\gamma^{SU}_i$ as with the first embodiment, the metrics of the expressions (7) and (10) are calculated. Then, as with the first embodiment, the UE set is determined such that the sum of these metrics becomes the largest.

When the UE set is determined, the transmission weight is calculated based on the concatenated channel matrix of the UEs belonging to the UE set. The concatenated channel matrix H in the second embodiment becomes like the following, for example:

$$H = \begin{bmatrix} h_{u(1),1,1} & \cdots & h_{u(1),1,L_1} & \cdots & h_{u(1),N_{TP},L_{N_{TP}}} \\ \vdots & \ddots & & & \vdots \\ h_{u(|u|),1,1} & \cdots & h_{u(|u|),1,L_1} & \cdots & h_{u(|u|),N_{TP},L_{N_{TP}}} \end{bmatrix}$$

Then, the transmission weight W using the concatenated channel matrix H is, for example, obtained in the following way:

$$W = BH^H(HH^H)^{-1}D$$

The matrix B can be expressed like the following by using the matrix $B_j$ that the transmitting and receiving weight $b_{j,1}$ of each RRH is concatenated.

$$B = \begin{bmatrix} B_1 & \cdots & 0 \\ \vdots & \ddots & \vdots \\ 0 & \cdots & B_{N_{TP}} \end{bmatrix}$$

The matrix $B_j$ that is the diagonal components of the matrix B is as follows:

$$B_j = [b_{j,1}\, b_{j,2}\, \cdots\, b_{j,L_j}]$$

As in the foregoing, according to the second embodiment, even when the RRHs form the respective transmitting and receiving beams, the metric based on the inner product between the total vector of the received power of the UEs that already belong to the UE set and the received power vector of the UE of new addition candidate is calculated, and the UE of addition candidate that increases the metric is added to the UE set. Thus, even when the RRH including a plurality of transmission antennas forms the transmitting and receiving beams, it is possible to reduce the number of times of real multiplication and to reduce the computational complexity.

In the above-described second embodiment, when the channel for each transmission antenna before multiplying the transmitting and receiving weight $b_{j,1}$ of each RRH is known, the concatenated channel matrix H' and the transmission weight W may be made as follows:

$$H' = \begin{bmatrix} h'_{u(1),1,1} & \cdots & h'_{u(1),1,M_1} & \cdots & h'_{u(1),N_{TP},M_{N_{TP}}} \\ \vdots & \ddots & & & \vdots \\ h'_{u(|u|),1,1} & \cdots & h'_{u(|u|),1,M_1} & \cdots & h'_{u(|u|),N_{TP},M_{N_{TP}}} \end{bmatrix}$$

$$W = H'^H(H'H'^H)^{-1}D$$

In the above, $h'_{i,j,m}$ represents the channel estimated value of the downlink channel between UE#i and the transmission antenna #m of RRH#j.

[c] Third Embodiment

The feature of a third embodiment is the point that, by obtaining an average correlation value that is an average value of the correlation between the UEs that already belong to the UE set and the UE of new addition candidate, and calculating the metric by using the average correlation value, it further reduces the computational complexity.

The configurations of a radio communications system and a baseband processing apparatus according to the third embodiment are the same as those in the first embodiment, and thus the explanations thereof are omitted. In the third embodiment, the UE-set determination processing carried out by the power-vector calculation unit 122, the UE-set determination unit 123, and the total-vector retention unit 124 is different from that in the first embodiment.

FIG. 6 is a flowchart illustrating the UE-set determination processing according to the third embodiment. In FIG. 6, the portions the same as those in FIG. 4 are denoted by the same reference signs, and the detailed explanations thereof are omitted.

First, from the channel estimated value of the uplink channel, the received power vectors of the respective UEs are calculated by the power-vector calculation unit 122 (Step S201). That is, based on the received power $p_{i,j}$, the received power vector $p_i$ of the UE#i expressed by the above-described equation (3) is calculated. By the UE-set determination unit 123, based on the received power $p_{i,j}$, the independent SINR $\gamma^{SU}_i$ that is expressed by the above-described equation (5) is calculated. On UE#i, when the received power vector $p_i$ and the independent SINR $\gamma^{SU}_i$ are thus calculated, it is determined whether the received power vectors and the independent SINRs have been calculated on all UEs (Step S203). When there is a UE not yet calculated (No at Step S203), the calculation of the received power vector and the independent SINR is repeated.

Then, when the received power vectors and the independent SINRs are calculated on all UEs (Yes at Step S203), the total vector, the UE set, and the maximum metric are initialized by the UE-set determination unit 123 and the total-vector retention unit 124 (Step S204).

After the initialization of each parameter, the metric for which each UE is added to the UE set is calculated. When there is a UE that increases the maximum metric more than before the UE is added, the processing of adding the relevant UE to the UE set is repeated. Specifically, by the UE-set determination unit 123, a single UE that is not yet added to the UE set is selected (Step S205), and the selected UE becomes an addition candidate to the UE set. Then, the metric corresponding to the throughput for which the UE of addition candidate is added to the UE set is calculated (Step S401). In calculating the metric, an average correlation value that is an average value of the correlation between the UEs that already belong to the UE set and the UE of addition candidate is calculated, and by using the average correlation value, the received SINRs of the respective UEs are calculated. Then, based on the received SINR, the metric corresponding to the throughput for which the UE of addition candidate is added to the UE set is calculated. The metric calculation processing will be described in detail later.

When the metric for which the UE of addition candidate is added is calculated, the calculated metric and the maximum metric are compared (Step S207). As a result of this comparison, when the calculated metric is greater (Yes at Step S207), the calculated metric becomes the new maximum metric (Step S208). In preparation for when another UE is further added to the UE set after one UE of addition candidate this time was added to the UE set, the average correlation value that corresponds to the new maximum metric is kept retained (Step S402). Meanwhile, when the calculated metric is equal to or less than the maximum metric (No at Step S207), the maximum metric is not updated.

In this way, when the calculation of the metric when one UE of addition candidate is selected is completed, it is determined whether all UEs that are not yet added to the UE set have been selected (Step S209). As a result of this determination, when there is a UE that is not yet selected (No at Step S209), one UE that is not yet added to the UE set is selected again (Step S205), and the calculation of the metric and the updating of the maximum metric are carried out (Step S206 to Step S208).

Then, when all UEs that are not yet added to the UE set are selected as the addition candidate one by one and the calculation of the metric is completed (Yes at Step S209), it is determined whether there is any UE that updated the maximum metric in the UEs selected as the addition candidate (Step S210). As a result of this determination, when there is no UE that updated the maximum metric (No at Step S210), it is determined that the current UE set is the ultimate UE set without adding UE newly. When there is a UE that updated the maximum metric (Yes at Step S210), one UE that maximizes the metric is newly added to the UE set and the total vector is updated (Step S211).

When UE is newly added to the UE set, by the UE-set determination unit 123, it is determined whether the number of UEs belonging to the UE set has reached a certain number (Step S212). As a result of this determination, when the number of UEs belonging to the UE set has reached the certain number (Yes at Step S212), it is determined that the current UE set is the ultimate UE set. When the number of UEs belonging to the UE set has not reached the certain number (No at Step S212), the UE that is not yet added to the UE set is selected again one by one and the determination of whether there is any UE that increases the metric is repeated (Step S205 to Step S210).

Next, the metric calculation processing in the third embodiment will be specifically described with reference to the flowchart illustrated in FIG. 7. The following metric calculation processing is carried out when one UE of addition candidate is selected by the UE-set determination unit 123.

First, the average correlation value between the UEs that already belong to the UE set and the UE of addition candidate is calculated (Step S501). The average correlation value is an index that indicates the degree of correlation among the received power vectors of a plurality of UEs and, for example, the average correlation value $C_i$ between the UE that already belong to the UE set and UE#i is defined by the following equation (14).

$$C_i = \frac{1}{|u|+1}\left\{\sum_{k=1}^{|u|}(p_{sum} + p_i - p_{u(k)}) \cdot p_{u(k)}^T + p_{sum} \cdot p_i^T\right\} \quad (14)$$

That is, the average correlation value is equivalent to the average of the inner product portion of the received power vectors in the above-described expressions (6) and (9). In equation (14), the inner product portion concerning the pieces of UE that already belong to the UE set and UE#i of addition candidate is averaged.

Incidentally, when the average correlation value at the previous time of adding UE that the |u|-th UE was added to the UE set is C(m−1), this average correlation value C(m−1) can be expressed like the following equation (15).

$$C(m-1) = \frac{1}{|u|} \left\{ \sum_{k=1}^{|u|} (p_{sum} - p_{u(k)}) \cdot p_{u(k)}^T \right\} \quad (15)$$

Accordingly, when equation (14) is expressed by using equation (15), the following equation (16) is obtained.

$$C_i = \frac{1}{|u|+1} \{|u|C(m-1) + 2p_{sum} \cdot p_i^T\} \quad (16)$$

Thus, when the average correlation value is calculated, the average correlation value at the previous time of adding UE is used, and the calculation by the above-described equation (16) is carried out. In equation (16), in order to calculate the inner product between the total vector and the received power vector, the real multiplication is carried out the number of times the same as the number of elements of the received power vector.

Then, by using the average correlation values, the received SINR of the UEs that already belong to the UE set and that of the UE of addition candidate are calculated (Step S502). By using the average correlation value $C_i$, even when UE#i is the UEs that already belong to the UE set or is the UE of addition candidate, the received SINR $\gamma^{MU}_i$ is calculated by the following equation (17).

$$\gamma^{MU}_i = \frac{\gamma^{SU}_i}{|u|+1}(1-C_i) \quad (17)$$

As just described, in the third embodiment, by calculating the average correlation value $C_i$ in advance, the received SINR can be calculated without distinguishing between the UEs that already belong to the UE set and the UE of addition candidate. That is, the calculation of the received SINRs concerning all UEs can be made in common. As is apparent from equation (17), once the average correlation value $C_i$ is calculated, the multiplication of vectors is not needed in calculating the received SINR. As a result, it is possible to further reduce the computational complexity.

When the received SINR $\gamma^{MU}_i$ of UE#i is calculated, this received SINR $\gamma^{MU}_i$ is converted into the instantaneous throughput (Step S503). Specifically, by a function such as Shannon capacity, the received SINR $\gamma^{MU}_i$ is converted into the instantaneous throughput, for example.

Then, the ratio of the instantaneous throughput of UE#i and the average throughput is calculated as a metric concerning UE#i (Step S504). That is, the metric $M_i$ concerning UE#i is, as with the first embodiment, calculated by the above-described equation (7). When the metric concerning UE#i is thus calculated, it is determined whether the calculation of the metrics on all UEs including the UEs that already belong to the UE set and the UE of addition candidate has been completed (Step S505). As a result of this determination, when there is a UE for which the metric is not yet calculated (No at Step S505), one appropriate UE is selected and the calculation of the metric is repeated (Step S502 to Step S504).

Subsequently, when the metrics on all UEs are calculated (Yes at Step S505), by summing these metrics, the metric for which the UE of addition candidate is added to the UE set is calculated (Step S506). As with the first embodiment, when this metric is greater than the maximum metric, the maximum metric is updated, and the UE corresponding to the ultimate maximum metric after all UEs are set as the addition candidates is added to the UE set.

As in the foregoing, according to the third embodiment, the average correlation value of the UEs that already belong to the UE set and the UE of addition candidate is calculated and, by using the average correlation value, the reception quality and the metric of each UE are calculated. Thus, the calculation of the metrics concerning all UEs can be made in common, and as the multiplication of vectors is no longer needed in the metric calculation, it is possible to reduce the computational complexity.

In the above-described third embodiment, it has been exemplified that the received SINR is calculated by using equation (17) that uses the average correlation value for the UE of addition candidate also. As for the UE of addition candidate, however, the received SINR may be calculated by equation (6) as with the first embodiment. In this case also, by calculating the received SINR of the UEs that already belong to the UE set by using the average correlation value, it is possible to achieve the reduction in the computational complexity.

[d] Fourth Embodiment

The feature of a fourth embodiment is the point that it determines the UE set in stages with different indexes and makes the throughput larger.

The configurations of a radio communications system and a baseband processing apparatus according to the fourth embodiment are the same as those in the first embodiment, and thus the explanations thereof are omitted. In the fourth embodiment, the UE-set determination processing carried out by the power-vector calculation unit 122, the UE-set determination unit 123, and the total-vector retention unit 124 is different from that in the first embodiment.

FIG. 8 is a flowchart illustrating the UE-set determination processing performed in the fourth embodiment. As illustrated in FIG. 8, in the fourth embodiment, the UE set is determined in three stages. That is, at the first stage, the UE for which the first metric using the independent SINR of each UE is large are extracted, for example (Step S601). Specifically, the first metric $M_i^{(1)}$ using the independent SINR $\gamma^{SU}_i$ of each UE is calculated by the following expression, and the $N_{MU1}$ pieces of UE are extracted in descending order from the UE for which the first metric $M_i^{(1)}$ is large.

$$M_i^{(1)} = \frac{T(\gamma^{SU}_i)}{t_i}$$

Next, at the second stage, with the $N_{MU1}$ pieces of the UE extracted at the first stage as the objects, the UEs that increase the metric as with the first embodiment are extracted (Step S602). That is, with a second metric that, as an index, the calculation is simplified by using the received power vector of each UE, the $N_{MU2}$ pieces of UE that increase the second metric are extracted.

At this second stage, the extraction of the UE using the second metric may be carried out repeatedly. That is, by excluding the $N_{MU2}$ pieces of UE that have been extracted at the first time, and carrying out the extraction of the UE using the second metric for the second time, the $N_{MU2}$ pieces of UE are further extracted. Subsequently, by repeating such extraction of the UE for T times, the $N_{MU2} \times T$ pieces of UE are extracted.

Then, at the third stage, with the $N_{MU2}$ pieces of or the $N_{MU2} \times T$ pieces of UE extracted at the second stage as the objects, the received SINR using the above-described equation (1) is calculated, for example, and the UE set that maximizes the metric based on this received SINR is determined (Step S603). That is, on the UE extracted at the second stage, as the indexes, with the received SINR using the channel response vector and with the detailed third metric, the UE set that maximizes the third metric is determined.

At this third stage, the UEs may be added to the UE set in the same order as the order of adding the UE at the second stage, the third metric may be calculated each time the UE is added, and the UE set at the time the third metric became the largest may be set as the ultimate UE set. Furthermore, at the second stage, when the $N_{MU2} \times T$ pieces of UE are extracted, the determination of the UE set using the third metric may be carried out on each group of the $N_{MU2}$ pieces of UE, and the UE set of the group for which the third metric became the largest may be set as the ultimate UE set.

As in the foregoing, according to the fourth embodiment, because the UE set is determined by using from a simple metric to a detailed metric in stages, it is possible to narrow down the UE with less computational complexity by the simple metric and is possible to determine the UE set that reliably increases the throughput by the detailed metric.

[e] Fifth Embodiment

The feature of a fifth embodiment is the point that the maximum metric is initialized each time a new UE is added to the UE set and the number of UEs belonging to the UE set is fixed.

In the second stage of the above-described fourth embodiment, it has been described that the $N_{MU2}$ pieces of UE are extracted by using the same metric as that of the first embodiment. In the first embodiment, however, as a result that all UEs were selected as the addition candidates, when there is no UE that contributed to the updating of the maximum metric, UE is never added to the UE set. Accordingly, the number of UEs belonging to the UE set is not fixed, and at the time there is no UE that increases the metric even when UE is added to the UE set, the UE set is determined. Thus, in the fifth embodiment, by initializing the maximum metric each time one UE is added to the UE set, until the number of UEs belonging to the UE set becomes a certain number, UE that corresponds to the maximum metric is added to the UE set one by one.

The configurations of a radio communications system and a baseband processing apparatus according to the fifth embodiment are the same as those in the first embodiment, and thus the explanations thereof are omitted. In the fifth embodiment, the UE-set determination processing carried out by the power-vector calculation unit 122, the UE-set determination unit 123, and the total-vector retention unit 124 is different from that in the first embodiment.

FIG. 9 is a flowchart illustrating the UE-set determination processing performed in the fifth embodiment. In FIG. 9, the portions the same as those in FIG. 4 are denoted by the same reference signs, and the detailed explanations thereof are omitted.

First, from the channel estimated value of the uplink channel, the received power vectors of the respective UEs are calculated by the power-vector calculation unit 122 (Step S201). That is, based on the received power $p_{i,j}$, the received power vector $p_i$ of UE#i expressed by the above-described equation (3) is calculated. By the UE-set determination unit 123, based on the received power $p_{i,j}$, the independent SINR $\gamma^{SU}_i$ that is expressed by the above-described equation (5) is calculated. On UE#i, when the received power vector $p_i$ and the independent SINR $\gamma^{SU}_i$ are thus calculated, it is determined whether the received power vectors and the independent SINRs have been calculated on all UEs (Step S203). When there is a UE not yet calculated (No at Step S203), the calculation of the received power vector and the independent SINR is repeated.

Then, when the received power vectors and the independent SINRs are calculated on all UEs (Yes at Step S203), the total vector and the UE set are initialized by the UE-set determination unit 123 and the total-vector retention unit 124 (Step S701). The maximum metric is also initialized (Step S702).

After the initialization of each parameter, the metric for which each UE is added to the UE set is calculated and the processing of adding the UE that makes the metric the largest to the UE set is repeated. Specifically, by the UE-set determination unit 123, a single UE that is not yet added to the UE set is selected (Step S205), and the selected UE becomes an addition candidate to the UE set. Then, the metric corresponding to the throughput for which the UE of addition candidate is added to the UE set is calculated (Step S206).

When the metric for which the UE of addition candidate is added is calculated, the calculated metric and the maximum metric are compared (Step S207). As a result of this comparison, when the calculated metric is greater (Yes at Step S207), the calculated metric becomes the new maximum metric (Step S208). Meanwhile, when the calculated metric is equal to or less than the maximum metric (No at Step S207), the maximum metric is not updated.

In this way, when the calculation of the metric when one UE of addition candidate is selected is completed, it is determined whether all UEs that are not yet added to the UE set have been selected (Step S209). As a result of this determination, when there is a UE that is not yet selected (No at Step S209), one UE that is not yet added to the UE set is selected again (Step S205), and the calculation of the metric and the updating of the maximum metric are carried out (Step S206 to Step S208).

Then, when all UEs that are not yet added to the UE set are selected as the addition candidate one by one and the calculation of the metrics is completed (Yes at Step S209), one UE corresponding to the maximum metric at this time is newly added to the UE set, and the total vector is updated (Step S211).

When the UE is newly added to the UE set, by the UE-set determination unit 123, it is determined whether the number of UEs belonging to the UE set has reached a certain number (Step S212). As a result of this determination, when the number of UEs belonging to the UE set has reached the certain number (Yes at Step S212), it is determined that the current UE set is the ultimate UE set. When the number of UEs belonging to the UE set has not yet reached the certain number (No at Step S212), the maximum metric is initialized (Step S702). That is, when a single UE is added to the UE set, the maximum metric is initialized, and when a subsequent UE of addition candidate is selected, this UE of addition candidate is to always contribute to the updating of the maximum metric. As a result, until the number of UEs belonging to the UE set becomes the certain number, a UE that corresponds to the maximum metric is added to the UE set one by one, and the number of UEs belonging to the UE set can be made equal to the certain number.

As in the foregoing, according to the fifth embodiment, because the maximum metric is initialized each time the UE is added to the UE set, and because the UE that maximizes the metric again is added to the UE set, the number of UEs belonging to the UE set can be made equal to a certain number.

According to one aspect of the transmission control apparatus and the transmission control method disclosed in the present application, an effect in that the computational complexity in determining the combination of the UE for which the signals are spatially multiplexed can be reduced, is exhibited.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission control apparatus for determining a group of terminal devices that are destinations to which signals are simultaneously transmitted out of a plurality of terminal devices, the transmission control apparatus comprising a processor that executes a process comprising:
    calculating received power vectors corresponding to received power of the respective terminal devices;
    determining, based on an inner product between a received power vector of a first terminal device that is determined to belong to the group of terminal devices already and a received power vector of a second terminal device that is a candidate to be newly added to the group of terminal devices, whether to add the second terminal device to the group of terminal devices; and
    generating transmission signals to be transmitted to a group of terminal devices that are determined in accordance with determination at the determining.

2. The transmission control apparatus according to claim 1, wherein the determining includes
    calculating a metric indicative of throughput based on an inner product between a total vector obtained by adding received power vectors of a plurality of first terminal devices, and a received power vector of the second terminal device, and
    determining to add the second terminal device to the group of terminal devices when the calculated metric is greater than a metric based on an inner product between the total vector, and a received power vector of another terminal device.

3. The transmission control apparatus according to claim 1, further comprising a storage that stores a total vector that is obtained by adding a received power vector of the second terminal device to a received power vector of the first terminal device when it is determined that the second terminal device is added to the group of terminal devices.

4. The transmission control apparatus according to claim 1, wherein the determining includes
    calculating a metric that becomes larger as an inner product between received power vectors on the first terminal device and the second terminal device is smaller, and
    determining to add the second terminal device to the group of terminal devices when the calculated metric is greater than a metric based on an inner product between the received power vector of the first terminal device and a received power vector of another terminal device.

5. The transmission control apparatus according to claim 1, wherein the determining includes determining, further based on an inner product between a vector that is obtained by subtracting a received power vector of one first terminal device from a vector that is obtained by adding received power vectors of a plurality of first terminal devices and a received power vector of the second terminal device and the received power vector of the one first terminal device, whether to add the second terminal device to the group of terminal devices.

6. The transmission control apparatus according to claim 1, wherein the determining includes
    calculating, by using an average correlation value of received power vectors of the first terminal devices, the average correlation value of received power vectors of the first terminal devices and the second terminal device and,
    based on the calculated average correlation value, determining whether to add the second terminal device to the group of terminal devices.

7. The transmission control apparatus according to claim 1, wherein the calculating includes calculating received power vectors corresponding to respective received power of a plurality of terminal devices selected by a certain criterion.

8. The transmission control apparatus according to claim 1, wherein the generating includes generating transmission signals to be transmitted to a plurality of terminal devices selected by a certain criterion out of the group of terminal devices that are determined in accordance with determination at the determining.

9. A transmission control method for determining a group of terminal devices that are destinations to which signals are simultaneously transmitted out of a plurality of terminal devices, the transmission control method comprising:
    calculating received power vectors corresponding to received power of the respective terminal devices, using a processor;
    determining, based on an inner product between a received power vector of a first terminal device that is determined to belong to the group of terminal devices already and a received power vector of a second terminal device that is a candidate to be newly added to the group of terminal devices, whether to add the second terminal device to the group of terminal devices, using the processor; and
    generating transmission signals to be transmitted to a group of terminal devices that are determined in accordance with determination at the determining, using the processor.

* * * * *